United States Patent

Sou-San

[11] Patent Number: 5,843,325
[45] Date of Patent: Dec. 1, 1998

[54] MOLD ASSEMBLY

[76] Inventor: Chen Sou-San, 58, Ma Yuan West St., Taichung, Taiwan

[21] Appl. No.: 864,881

[22] Filed: Jun. 1, 1997

[51] Int. Cl.[6] ............................................. B29C 33/76
[52] U.S. Cl. ........................ 249/103; 249/134; 249/140; 249/144; 425/DIG. 44
[58] Field of Search .................... 249/103, 104, 249/140, 142, 144, 134; 425/DIG. 44

[56] References Cited

U.S. PATENT DOCUMENTS

| | | | |
|---|---|---|---|
| 820,160 | 5/1906 | Wiest | 249/144 |
| 949,172 | 2/1910 | Elliott | 249/144 |
| 1,442,334 | 2/1923 | McCulley | 249/144 |
| 4,300,746 | 11/1981 | Schoen | 249/144 |
| 5,326,521 | 7/1994 | East | 249/134 |

*Primary Examiner*—Patrick Ryan
*Assistant Examiner*—Joseph Leyson

[57] ABSTRACT

A mold assembly has a cylindrical inner mold device, and a plurality of outer mold devices enclosing the cylindrical inner mold device. The inner mold device has a threaded interior engaging with a lower portion of a hollow threaded cover and a flange surrounding an outer periphery of the inner mold device. Each of the outer mold devices has a silicone mold and an aluminum mold enclosing an outer periphery of the silicone mold. Each of the silicone mold has at least a pattern cavity. A spacing is defined between the inner mold device and the outer mold devices. An upper annular retainer retains an upper portion of the mold assembly. A lower annular retainer retains a lower portion of the mold assembly.

1 Claim, 2 Drawing Sheets

MOLD ASSEMBLY

BACKGROUND OF THE INVENTION

The invention relates to a mold assembly. More particularly, the invention relates to a mold assembly which has at least a silicone mold having pattern cavities.

A cylindrical product such as a handlebar casing cannot have complex patterns. The patterns may be painted on the cylindrical product. However, the hand of the user may be contaminated.

SUMMARY OF THE INVENTION

An object of the invention is to provide a mold assembly which has at least a silicone mold having pattern cavities to mold a product with patterns.

Another object of the invention is to provide a mold assembly which has at least a silicone mold enclosed by an aluminum mold so that the aluminum mold can protect the silicone mold.

Accordingly, a mold assembly comprises a generally cylindrical inner mold device, a plurality of outer mold devices enclosing the generally cylindrical inner mold device, and a hollow threaded cover covering the inner mold device. The inner mold device has a threaded interior engaging with a lower portion of the hollow threaded cover and a flange surrounding an outer periphery of the inner mold device. Each of the outer mold devices has a silicone mold and an aluminum mold enclosing an outer periphery of the silicone mold. Each of the silicone molds has at least a pattern cavity. A spacing is defined between the inner mold device and the outer mold devices. An upper annular retainer retains an upper portion of the mold assembly. A lower annular retainer retains a lower portion of the mold assembly.

DETAILED DESCRIPTION OF THE INVENTION

Figure 1:
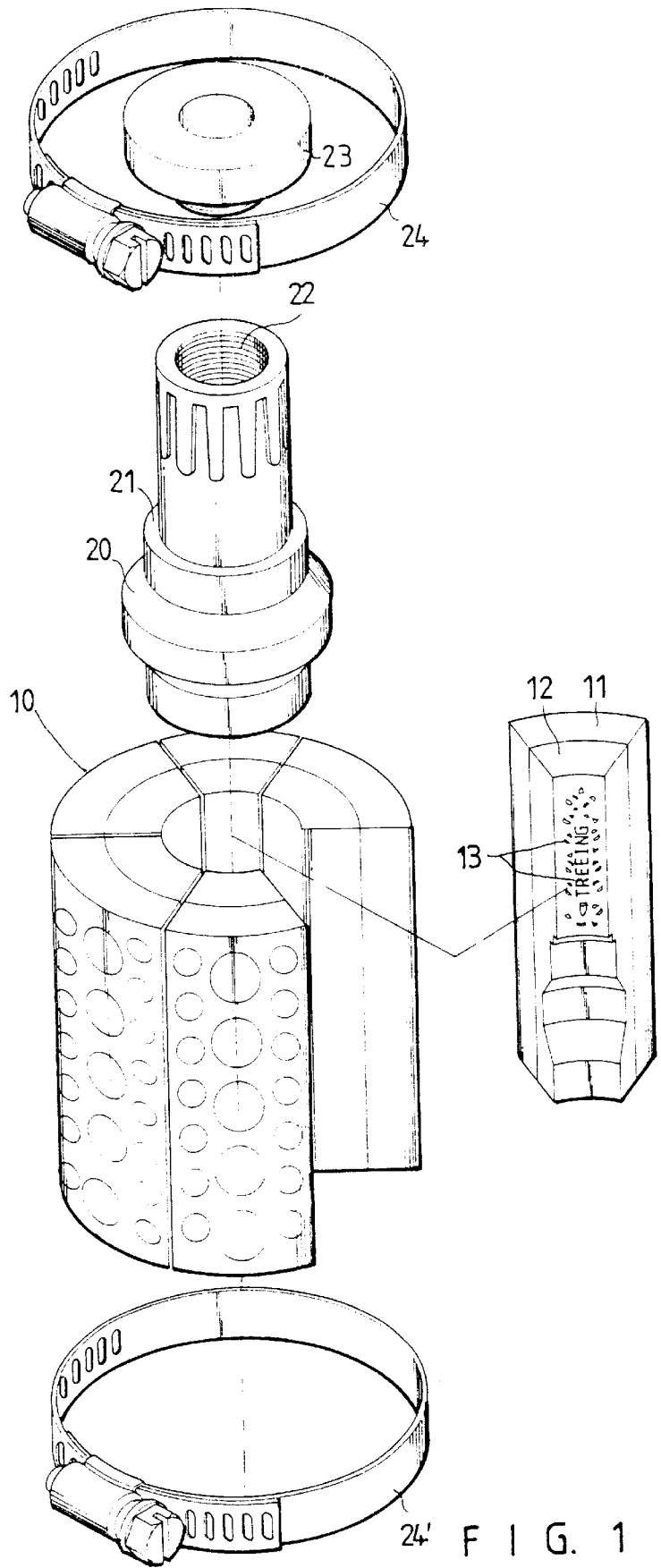
FIG. 1 is a perspective assembly view of a mold assembly of a preferred embodiment in accordance with the invention.
Figure 2:
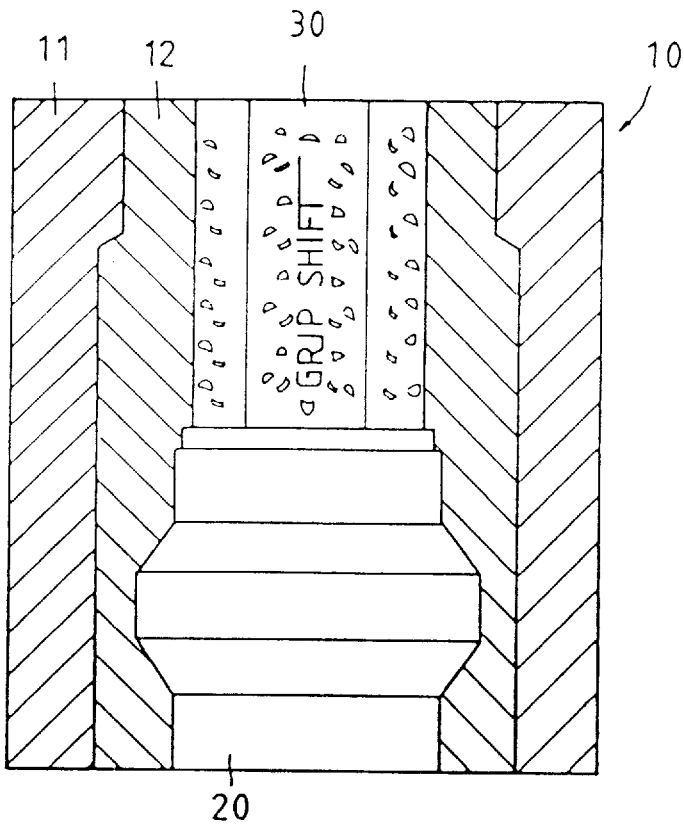
FIG. 2 is a sectional view of a mold assembly of a preferred embodiment with a cylindrical product therein.

Referring to FIGS. 1 and 2, a mold assembly has a generally cylindrical inner mold device 20, a plurality of outer mold devices 10 enclosing the generally cylindrical inner mold device 20, and a hollow threaded cover 23 covering the inner mold device 20. The inner mold device 20 has a threaded interior 22 engaging with a lower portion of the hollow threaded cover 23 and a flange 21 surrounding an outer periphery of the inner mold device 20. Each of the outer mold devices 10 has a silicone mold 12 and an aluminum mold 11 enclosing an outer periphery of the silicone mold 12. Each of the silicone molds 12 has at least a pattern cavity 13. A spacing is defined between the inner mold device 20 and the outer mold devices 10. An upper annular retainer 24 retains an upper portion of the mold assembly. A lower annular retainer 24' retains a lower portion of the mold assembly.

Figure 3:
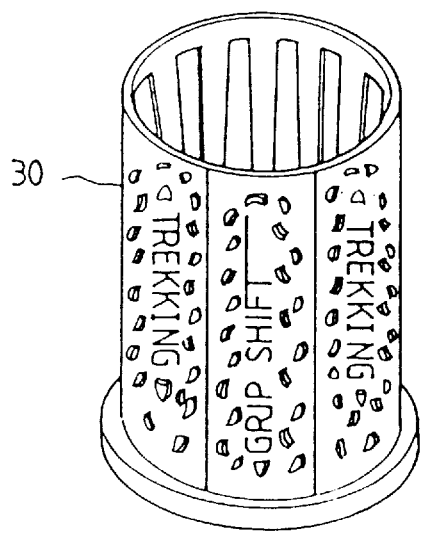
FIG. 3 is a perspective view of a cylindrical product.

A first liquid plastics materials is filled in each pattern cavity 13. Each outer mold device 10 is placed in an oven for about 10 minutes at elevated temperatures to solidify the first liquid plastics materials. Each outer mold devices 10 encloses the generally cylindrical inner mold device 20. An upper annular retainer 24 retains an upper portion of the mold assembly. A lower annular retainer 24' retains a lower portion of the mold assembly. A second liquid plastics materials is poured into the spacing. The hollow threaded cover 23 covers the inner mold device 20. The mold assembly is placed in an oven for about 20 minutes at elevated temperatures to solidify the second liquid plastics materials. The mold assembly is disassembled to move a cylindrical product 30 (as shown in FIG. 3).

Therefore, the aluminum mold 11 can protect the silicone mold 12. Furthermore, the mold assembly is easily assembled or disassembled.

The invention is not limited to the above embodiment but various modification thereof may be made. Further, various changes in form and detail may be made without departing from the scope of the invention.

I claim:

1. A mold assembly comprises:

a generally cylindrical inner mold device, a plurality of outer mold devices enclosing the generally cylindrical inner mold device, a hollow threaded cover covering the inner mold device, the inner mold device having a threaded interior engaging with a lower portion of the hollow threaded cover and a flange surrounding an outer periphery of the inner mold device, each of the outer mold devices having a silicone mold and an aluminum mold enclosing an outer periphery of the silicone mold, each of the silicone molds having at least a pattern cavity, a spacing defined between the inner mold device and the outer mold devices, an upper annular retainer retaining an upper portion of the mold assembly, and a lower annular retainer retaining a lower portion of the mold assembly.

* * * * *